April 22, 1952 H. Z. GORA 2,593,439
MACHINE AND METHOD FOR MANUFACTURING CLOSURES
Filed Oct. 20, 1948 5 Sheets-Sheet 2

INVENTOR.
Henry Z. Gora
BY
Johnson and Kline
ATTORNEYS

April 22, 1952 H. Z. GORA 2,593,439
MACHINE AND METHOD FOR MANUFACTURING CLOSURES
Filed Oct. 20, 1948 5 Sheets-Sheet 4

INVENTOR.
Henry Z. Gora
BY
Johnson and Kline
ATTORNEYS

April 22, 1952 — H. Z. GORA — 2,593,439
MACHINE AND METHOD FOR MANUFACTURING CLOSURES
Filed Oct. 20, 1948 — 5 Sheets-Sheet 5
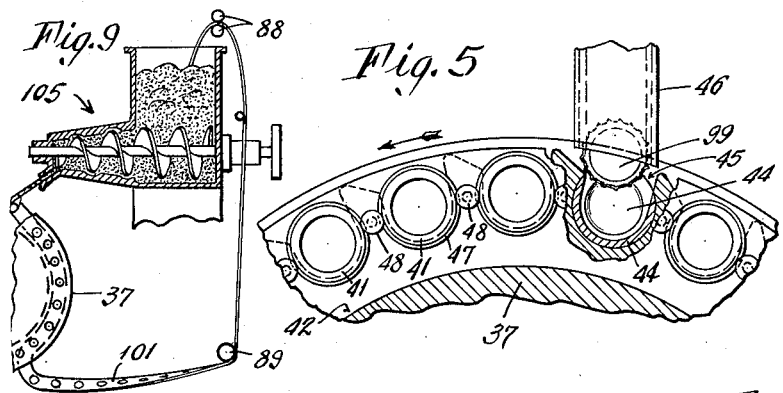
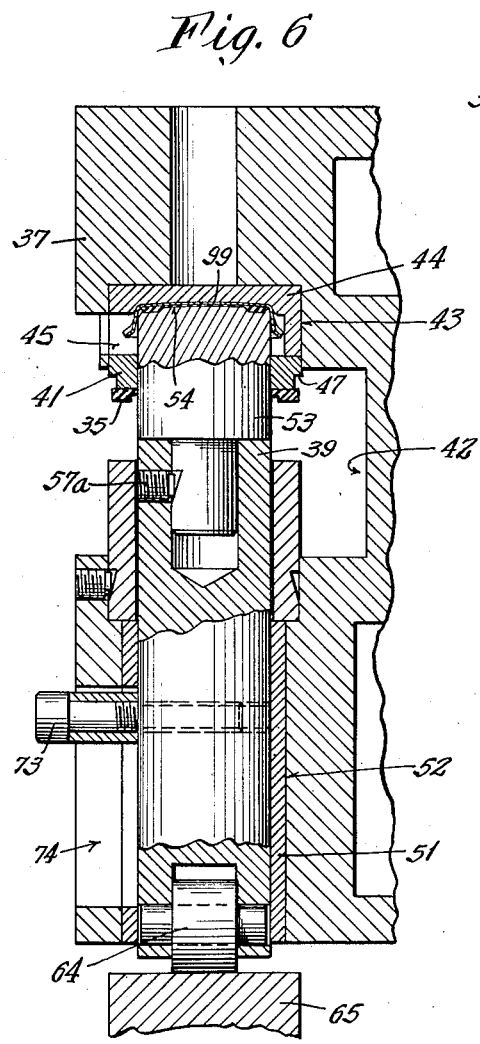
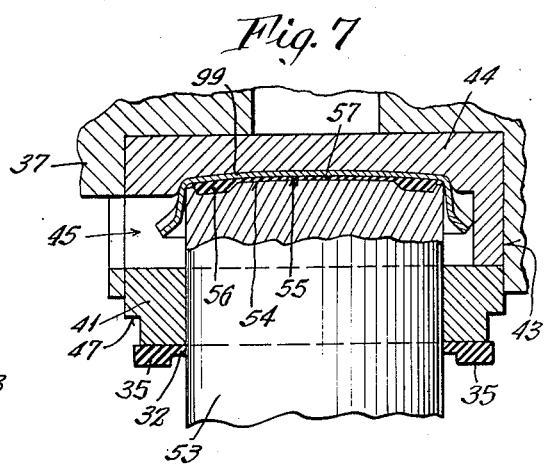
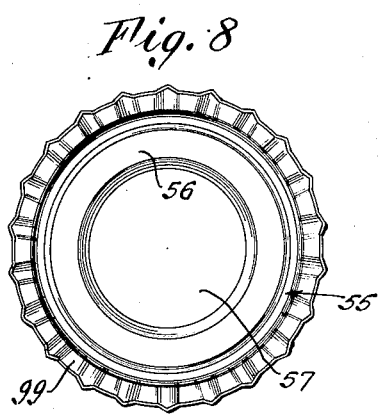
INVENTOR.
Henry Z. Gora
BY
Johnson and Kline
ATTORNEYS Patented Apr. 22, 1952

2,593,439

UNITED STATES PATENT OFFICE 2,593,439

MACHINE AND METHOD FOR MANUFACTURING CLOSURES

Henry Z. Gora, Stratford, Conn., assignor, by mesne assignments, to Anchor Hocking Glass Corporation, Lancaster, Ohio, a corporation of Delaware Application October 20, 1948, Serial No. 55,508

29 Claims. (Cl. 18—5)

This invention relates to manufacture of closures for containers. Although it is hereinafter described for the purposes of disclosure in connection with the manufacture of beverage crowns, it will be apparent that the invention is equally well adapted to the manufacture of other types of closures, particularly to deep-skirted caps.

An object of the present invention is to provide an automatic machine of high productive capacity for continuously producing liners or gaskets from stock material of any suitable type and adhering them to successive closure members in a continuous operation.

A further object is to provide an improved method of manufacturing closure members having molded gaskets secured therein.

A feature of the invention is the provision of a rotary machine for continuously blanking gaskets from moldable gasket-forming material, depositing the individual blanked gaskets in closure members and molding them in place therein to any predetermined form for a molding period the length of which can be fixed independently of the speed of operation of the machine.

A further feature is the blanking of a gasket from a supply of moldable material, the depositing of the blank in a closure member together with the molding of the blank to form a finished gasket and adhering it to the closure member, all in a single operation, by a single punching member.

A further feature is the provision of a machine constructed and arranged to successively cut gaskets from a continuous strip of moldable material and deposit the gaskets in successive bottle caps by means of die members movable relatively to each other along rectilinear lines only, thus avoiding the disadvantages incident to the use of dies having a rolling action or other relative movement along curvilinear lines.

Improvements illustrated and described herein relating to the manufacture of composite articles generally are claimed in my copending application Serial No. 96,965, filed June 3, 1949.

In the accompanying drawings—

Fig. 5 is a partial view with parts in section of the closure holding pocket in the edge of the drum and means for feeding closures thereto.

Figs. 6 and 7 are sectional views on an enlarged scale showing the operation of the strip punching die members.

Fig. 8 is a bottom plan view of a closure member produced in accordance with the present invention.

Fig. 19 illustrates how one form of extruding mechanism can be used in connection with the invention.

Figure 1:
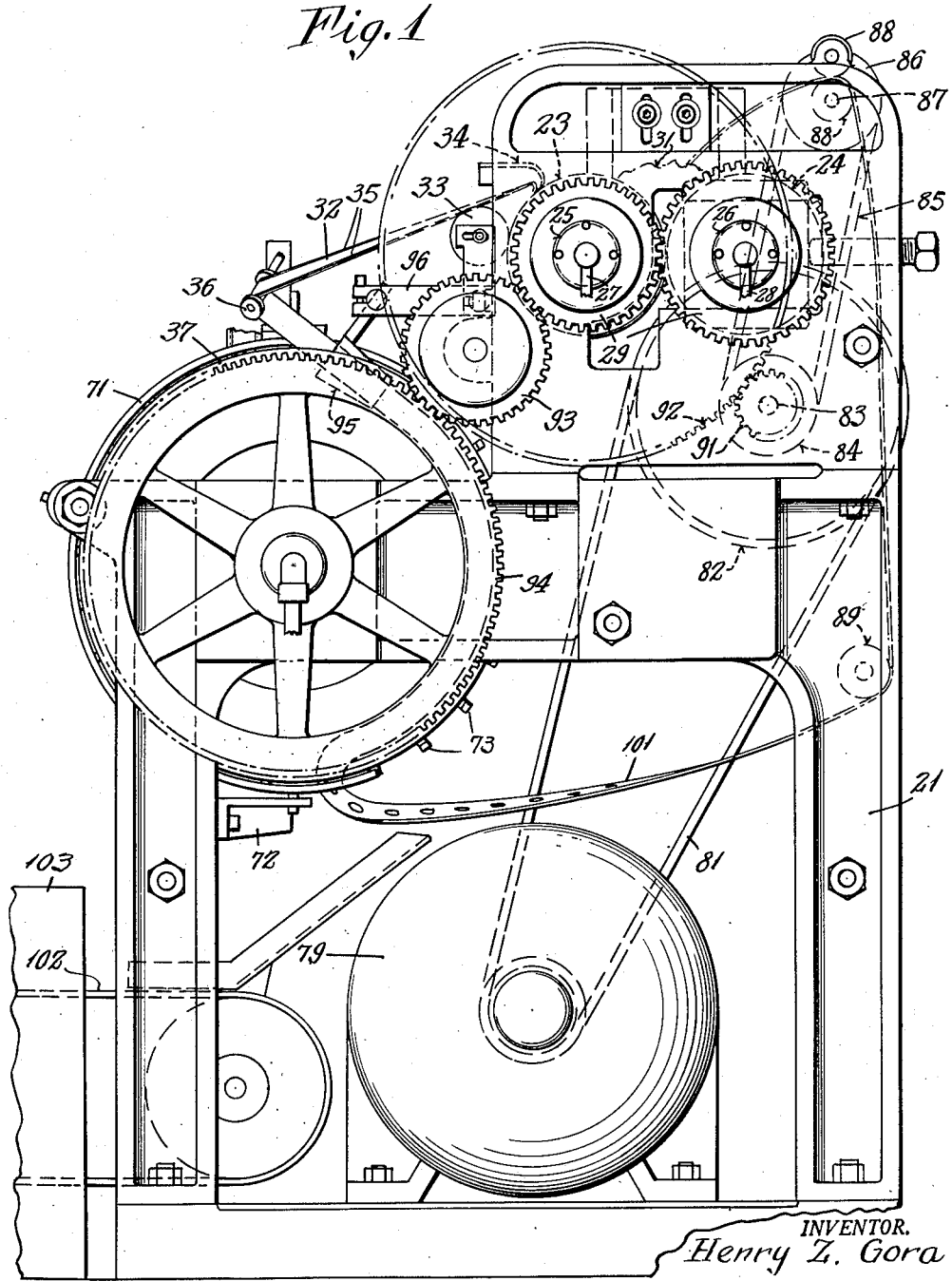
Figure 1 is a side elevation of a machine constructed in accordance with one embodiment of this invention for carrying out the method which constitutes a further part of the invention.

The objects and advantages of the invention are accomplished in part by causing an endless row of articles such as unlined caps or other closure members, and a continuous strip of moldable material, frequently having the characteristics of a curable rubber compound, to move continuously along juxtaposed paths. While so moving, gaskets are successively blanked from the strip and deposited in successive caps under such conditions of heat and pressure as to shape the blanks to form gaskets of predetermined configuration and cause the shaped gaskets to adhere to the caps.

Moreover, specifically in the illustrated embodiment of this invention, the continuous strip of liner or gasket material is guided between cutting and punching dies mounted for relative movement along rectilinear lines on the periphery of a rotary supporting carrier. Rotation of the carrier causes the punching dies to operate seriatim to successively cut gasket-forming blanks from the continuous strip. Each blank temporarily adheres to the associated punching die, the further movement of which transfers the punched out blank directly into position in a closure member located in an adjacent retaining pocket on the carrier, molds it therein to final form under suitable molding pressure and adheres the molded gasket in place.

The illustrated embodiment of the present machine is shown as including a supporting frame 21 having a plasticizing mill 22 comprising a pair of mill rollers 23, 24, supported in the upper part of the frame on parallel rotary shafts 25 and 26, respectively, the temperature of the rollers being controlled by fluid delivered thereto by lines 27 and 28 in the usual way. Gears 29 connect the mill rollers for simultaneous and differential rotation. A batch 31, which may, for example, comprise suitably compounded rubber, natural or synthetic, or other moldable material, is supplied to the mill rollers and a continuous layer of plasticized material is formed around the roller 23, which is usually operated at a higher temperature than the roller 24 so that the material will adhere thereto. From this layer a strip 32 is separated and continuously removed by a pair of cutters 33 and a scraper 34.

The material stripped from the mill is sometimes relatively thin in order to conserve material and produce gaskets of the desired thickness. To prevent tearing or breaking a thin strip in the machine, it is, according to the present invention, formed with longitudinal reinforcing ridges extending continuously along the side edges, and the width of the strip is such that the gaskets are punched from the relatively thin material lying between the reinforcing edges. Accordingly, the mill roller is formed with spaced strip-shaping grooves 30 adjacent the cutters 33 for the purpose of forming a strip 32 having longitudinally extending reinforcing ridges 35 extending continuously along the edges of the strip.

The strip 32 is guided over an idler roller 36 supported on the frame above a rotary die-carrying drum 37, mounted on a rotary supporting shaft 38. A series of cooperating, relatively movable punches 39 and cutting dies 41 are supported around the peripheral face of the drum on opposite sides of a circumferential slot 42 into which the strip 32 is guided. Each cutting die 41 is mounted in a recess 43 formed in one face of the slot 42. A closure holding member 44 is positioned in the recess 43 beneath the cutting die 41 and is formed to provide a closure-receiving pocket 45 open on the radially outer side to receive closures from a magazine or feeding tube 46 past which the drum rotates in the direction indicated by the arrow in Fig. 5. Each cutting die is formed with an annular shoulder 47, see Figs. 5, 6 and 7, engaged by die clamping bolts 48, or the like, mounted on the drum between each pair of cutting dies 41 to clamp the dies and closure-holding pocket members securely in place.

Each punch 39 is mounted for movement relative to the associated cutting die along rectilinear lines in a punch-supporting bushing 51 mounted in openings 52 extending through the drum from the slot 42 outwardly. Each punch 39 carries a removable punch die 53 having a die face 54 of suitable configuration for shaping the punched gasket material to the desired form when pressed by the punch against the inner face of a closure member. As illustrated, the punch die face is shaped to form a gasket or liner 55, see Figs. 6 and 7, having a relatively thick annular ring 56 and a relatively thin skin-like membrane 57 for covering the surface of the closure member within the confines of the ring 56. Each punch die member 53 is removably secured in the end of the punch 39 by a threaded pin 57a to permit replacement by similar dies or by dies shaped to form other configurations of liner.

During each revolution of the carrier drum 37, the punches are successively operated to pierce the strip and punch gasket blanks from the material of the strip 32 between the reinforcing ridges 35, the strip being impaled on the punches and traveling therewith. As shown in Figs. 6 and 7, further movement of each punch deposits the blanked gasket in the associated closure member, located in the associated retaining pocket 45, under suitable conditions of pressure and heat to form the desired gasket. The punch is operated to mold and shape the gasket blank against the inner face of the closure member and cause it to adhere thereto. As hereafter described, the molding period can be fixed to extend for any portion of the drum travel, and the punches retracted at such point in the rotation thereof as will provide the desired time of molding.

Figure 4:
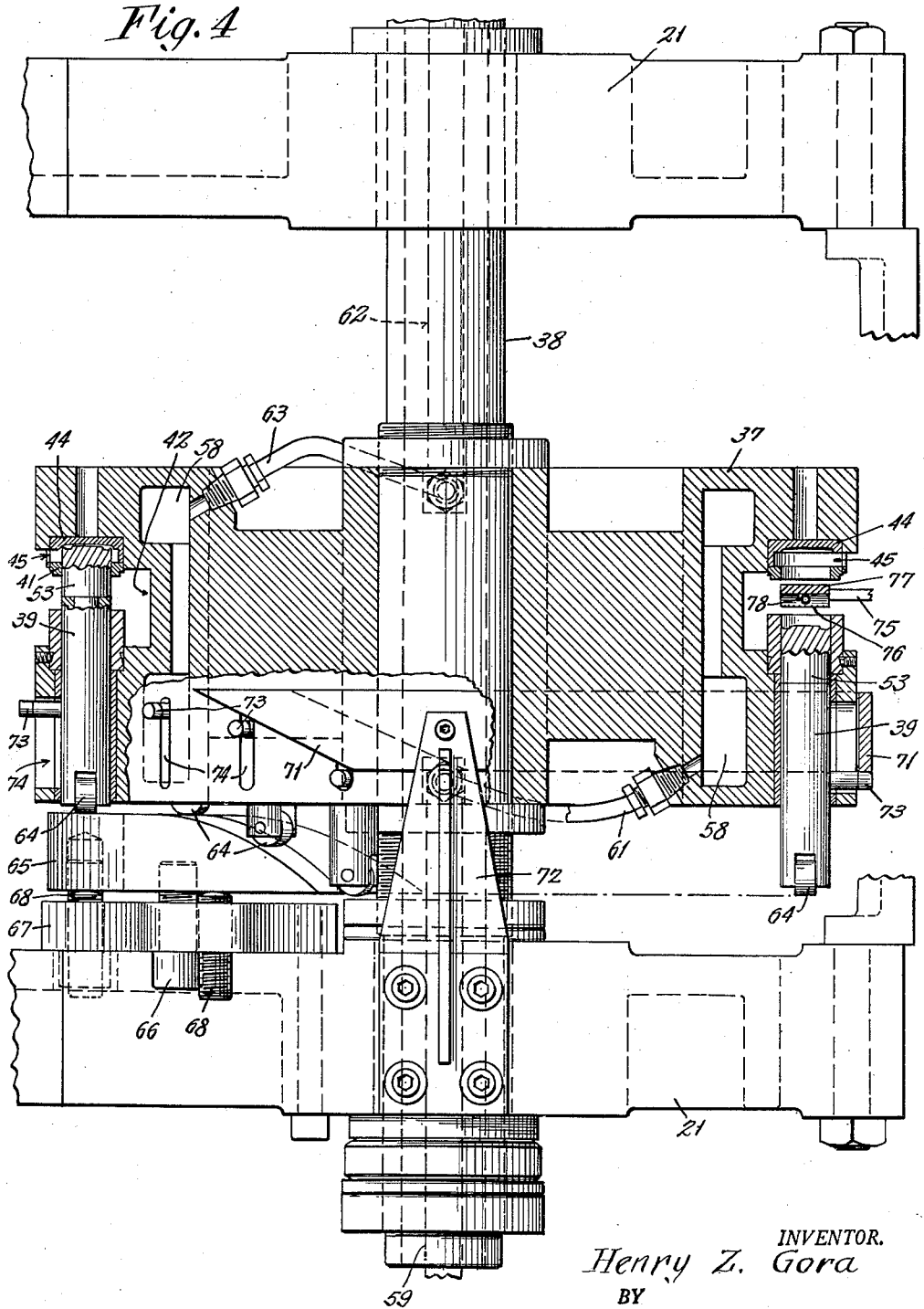
Fig. 4 is a partial sectional view of the drum, with associated mechanism shown in elevation.

The temperature of the drum is controlled by circulating fluid such as steam, cold water, or other thermal fluid through passages 58, see Fig. 4. For this purpose, one end of the drum-supporting shaft 38 is provided with a fluid transmitting passage 59 connected by a pipe connection 61 to the passage 58 on one side of the drum, and a passage 62 is formed in the other end of the supporting shaft 38 and connected to the passage 58 on the other side of the drum by pipe connection 63. With this arrangement, any suitable temperature controlling fluid can be circulated through the drum to maintain the desired temperature gradient. For example, in the illustrated machine, it may be found desirable to heat the drum sufficiently for the closure members to be at a somewhat higher temperature than the punch dies 53 in order to assist in adhering the gaskets to the closures when the gaskets are formed of rubber or materials having the characteristics thereof.

A cam follower 64 is rotatably mounted in the projecting end of each punch so that upon rotation of the drum 37 the different cam followers successively engage a punch operating cam 65, secured by suitable supporting cap bolts 66 on a cam supporting member 67 clamped to the machine frame. The cam 65 is adjustable axially of the punches 39 to accurately fix the stroke of the latter. As shown, adjustable pins 68 are threaded through the cam supporting bracket member 67 to form backing members against which the cam 65 is drawn into tight abutment by the supporting screws 66. Obviously, adjustment of the threaded pins 68 in the bracket 67 will determine the position of the cam 65 axially of the punches and, hence, the punch stroke.

Rotation of the drum causes each punch to be moved inwardly by the cam 65 from the open position shown at the right of Fig. 4 to the closed position shown at the left thereof, and also shown in Figs. 6 and 7. In so moving a liner blank is cut from the strip 32 and is carried by the punch into position in the adjacent closure member. The inward movement terminates short of actual contact of the closure member by the punch face, but leaves a material molding space between the punch and member. The position and shape of the cam is such that the punch presses the blank into the associated closure member with a molding pressure sufficient to shape the blank to form the finished gasket and to cause the latter to adhere to the closure member. The length of time that the punch remains in engagement with the gasket, with any given speed of rotation of the drum 37, will be determined by the arcuate length of the punch operating cam 65, which can be designed to extend the period for any desirable portion of the complete revolution of the drum. At the end of the molding period, the punch dies are successively retracted to free the impaled strip 32 and the completed closure member by a punch retracting cam 71 mounted on supporting brackets 72 secured at spaced points on the machine frame. The retracting cam 71 is formed to engage a cam follower 73 secured to the punch 39 and projecting radially outward through slots 74 formed in the periphery of the drum and in the punch supporting bushing 52. The retracting cam is so positioned as to successively engage the cam followers on succeeding punches at the end of the molding operation to retract the punch dies as described. Because relative movement between the associated cutting dies and the punches is rectilinear each gasket is deposited in the associated cap under pressure applied simultaneously over the entire gasket surface and in an even and symmetrical manner, so that the completed gasket is molded to the exact form desired and its dimensions accurately controlled.

As shown in Fig. 4, mold lubricant is supplied to the punch die faces through a supply line 75 to the curved face 76 of an applicator 77 from which it is blown by an air stream delivered through a nozzle 78 across the curved face of the applicator onto the molding dies 53 as the drum 37 rotates.

Figure 2:
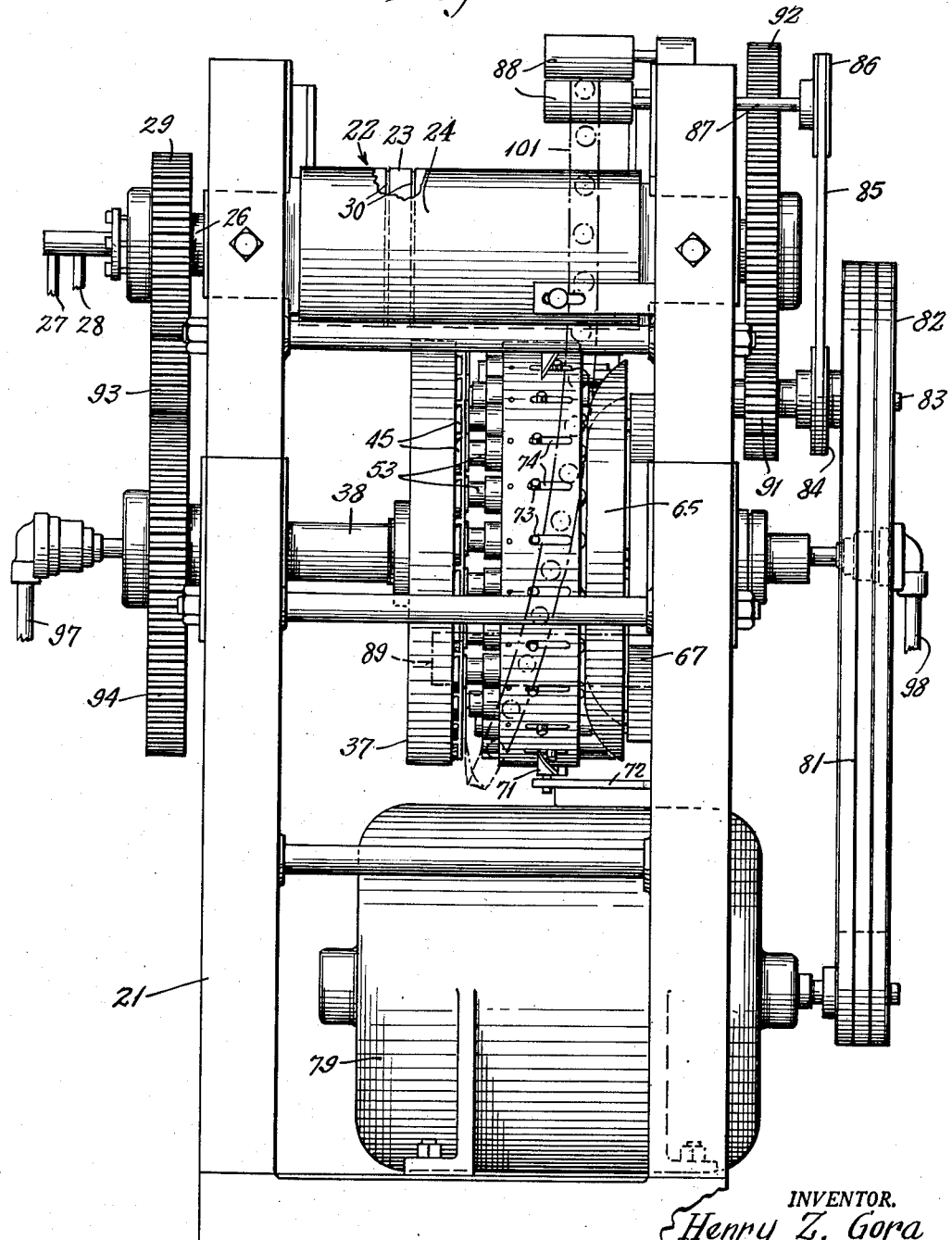
Fig. 2 is an end elevation looking from the right of Fig. 1.

The mill rollers and rotary drum are all driven from any suitable source of power such, for example, as an electric motor 79 connected by a belt 81 to a pulley 82 on a shaft 83 having a pulley 84 connected by belt 85 with a pulley 86 driving a shaft 87 rotating a pair of strip returning rollers 88, to which the skeletonized strip is guided after removal from the drum 37 by an idler roller 89, see Figs. 1 and 2. The belt driven shaft 83 has a small spur gear 91 driving a relatively large mill operating gear 92 secured to the mill shaft 25, on the opposite end of which one of the gear wheels 29 is secured. The latter is connected by an idler gear 93 with a drum driving gear 94.

Figure 3:
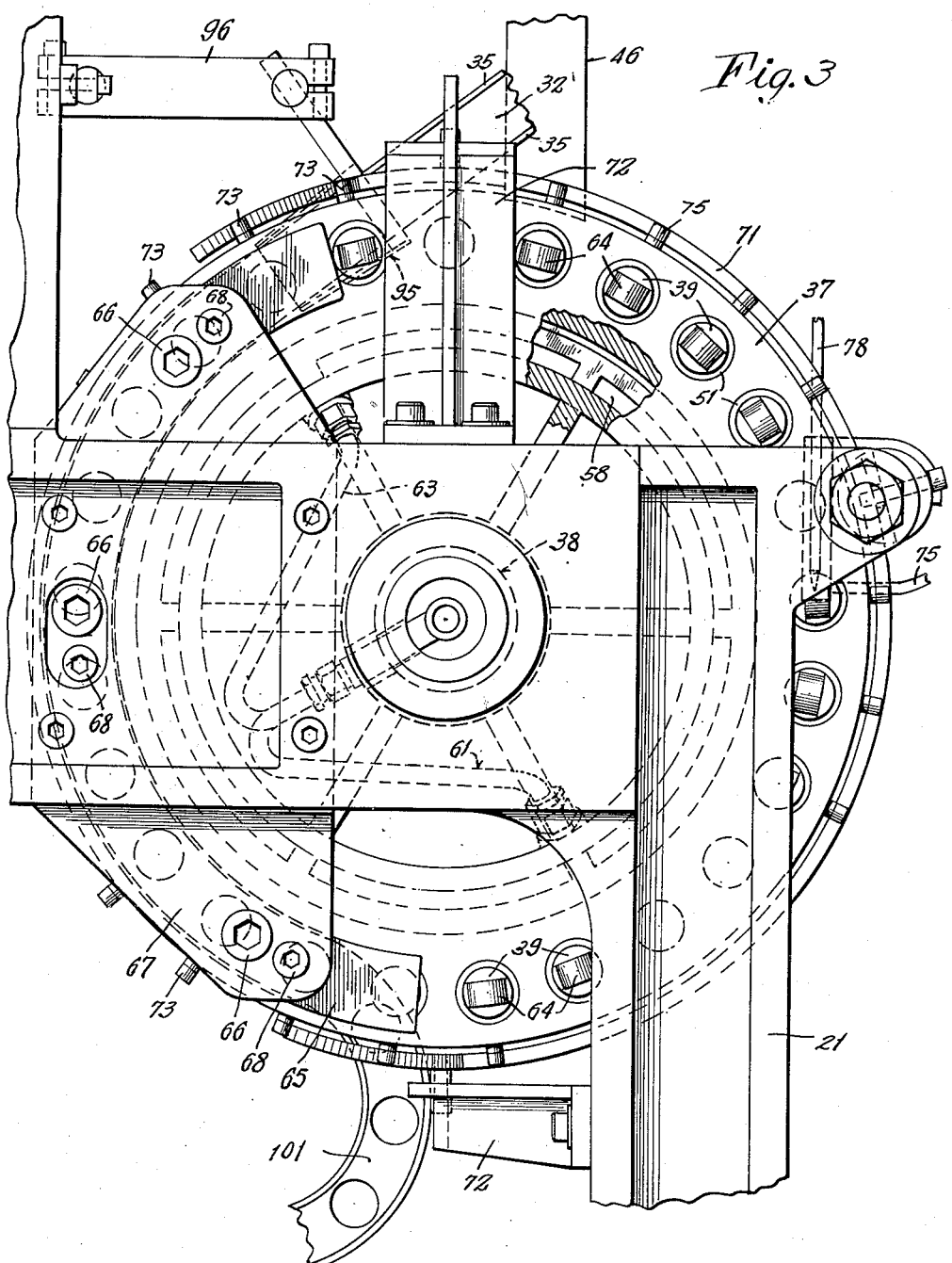
Fig. 3 is an elevation of the rotary die supporting drum forming a part of the machine illustrated in Figs. 1 and 2.

A strip guiding funnel 95, see Figs. 1 and 3, is mounted on a supporting bracket 96 to guide the strip 32 into position between the cutting and punching dies. As shown in Fig. 2, fluid supply and return lines, 97 and 98 are connected to the fluid passages 59 and 62 in the drum shaft 38.

The skeletonized strip 101 is returned to the plasticizing mill for reincorporation in the batch 31 by the strip return rollers 88 so that substantially all waste of gasket material is avoided. When compounded rubber or the like is employed as the moldable material, the accelerators in the compound should be such as permit the return of the strip to the mill before curing of the material takes place. Obviously, the variation in the molding period which is permitted in the present invention results in increasing the range of accelerators that can be used.

In the operation of the illustrated machine, a supply of closure caps such, for example, as the illustrated beverage crowns 99 are fed from any suitable magazine or other source (not shown) through the supply tube 46, see Fig. 5, so that upon rotation of the carrier drum 37 successive closure members are deposited in successive retaining pockets 45 and moved by rotation of the drum through a predetermined path. The continuous strip 32 of moldable gasket-forming material, which may of course be taken from the mill rollers described or other strip producing means, is directed through the guiding funnel 95 into position in the drum slot 42 between the successive relatively movable punches 39 and cutting dies 41 for movement therewith along a path adjacent to the path of the moving closure members 99. Rotation of the drum 37 causes successive punches 39 to be operated along rectilinear lines by the punch-operating cam 65 to impale the strip and cut a gasket blank from the material thereof between the reinforcing ridges 35 and to transfer the blank to the associated closure member pressing it therein under sufficient pressure applied equally over the entire gasket surface, and at such temperature as to mold the material of the blank evenly and symmetrically to accurately form a gasket having the desired configuration, at the same time causing the material to be adhered to the closure member over substantially the entire surface covered thereby. The mold is kept closed for the desired length of time at the expiration of which the punch members move off the closing cam 65 and the opening cam 71 successively engages the pins or radial cam followers 73 to retract the punches, free the impaled strip for return to the mill and free the lined closure members for ejection from the machine. The latter may as in the form shown drop by gravity out of the retaining pockets as they reach the lower part of the drum. If the gasket material is to be subjected to a curing operation, it is cured in place in the closure members by causing them to drop on to a suitable conveyor such as a belt 102 for travel through a curing oven 103 or the like.

The continuous strip 32 can be prepared in any suitable mechanism other than the mill shown in Figs. 1 and 2. As shown in Fig. 9, for example, a screw extruding operated machine 105 can be used to form the strip 32.

It will be apparent that the present invention provides a continuous method of supplying closure members with molded liners or gaskets by forming the gaskets, depositing them and accurately molding them while in place in closure members and causing them to adhere thereto by a pressure which is evenly distributed over the gasket blank and while the closure members and the gasket-forming material are moving continuously through juxtaposed paths. As a result, not only are the gaskets accurately formed to the required specifications, but the operation is conducted at a high speed resulting in quantity production at a reduced cost. The molding period can be fixed at any suitable length of time without slowing up the operation and any subsequent curing can be effected as a part of the continuous process without however affecting the speed of the gasket-forming and applying operations.

Although the speed of rotation of the carrier drum 37 may be set relatively high in order to obtain high production, the speed at which the punches 39 and cutting dies 41 are made to approach each other can be fixed at any desired value merely by suitably designing the punch-operating cam 65. In other words, the machine of the present invention can be operated at a high drum speed for the purposes of high production without requiring corresponding speed of movement of the punches 39

While the present invention provides the advantages of continuous rotary operation, the relative movement between the cooperating punch and die members is entirely on rectilinear lines with all of the resulting advantages, and the molding pressure can be maintained at its maximum during the entire molding period throughout the entire area of the gasket material.

Obviously, the invention can be variously modified and adapted, and portions of the improvements can be used without others.

I claim:

1. A machine comprising means for moving a

1. A machine comprising means for moving a series of closure members along a predetermined path, means for guiding a prepared strip of liner-forming material along a path juxtaposed to the path of said closure members, means including a series of successively operated punches travelling with substantially constant speed in a closed circular path, means for operating said punches for successively cutting liner blanks from said strip during movement thereof and means for operating said punches for depositing said blanks in successive closure members.

2. A machine comprising means for moving a series of closure members along a predetermined path, means for guiding a prepared strip of moldable liner-forming material along a juxtaposed path, means including a series of punches, means for operating said punches for successively cutting liner blanks from said strip during movement thereof, means for operating said punches for depositing said blanks in successive closure members, and applying pressure sufficient to mold said blanks to form liners in said members during movement thereof along said predetermined path.

3. A machine comprising in combination, a series of several pairs of cooperating punch and die members, means for positioning a closure element adjacent each pair of cooperating punch and die members, and means for causing relative movement between successive cooperating die members to cause the punch members to blank successive gaskets from moldable gasket material placed between said punch and die members and cause each punch member to deposit a gasket in an associated closure element under sufficient pressure to mold it therein to determinate form and adhere it thereto said last-named means including means for maintaining a plurality of said pairs of punch and die members simultaneously in gasket-molding position.

4. A machine comprising in combination, a rotary drum, a series of pairs of cooperating blanking punch and die members supported on said drum for movement therewith, means for supporting a closure element on said drum adjacent each pair of cooperating punch and die members, means for guiding a prepared strip of gasket material between said cooperating punch and die members, and means responsive to movement of said drum for causing relative movement between successive cooperating punch and die members to cause the punch members to blank a gasket from said strip of gasket material placed between said members and deposit said blanked gasket in the associated closure element.

5. A machine comprising in combination, a rotary drum, a series of cooperating blanking punch and die members mounted on said drum for relative rectilinear movement, means for supporting a closure element on said drum adjacent each pair of cooperating punch and die members, means for continuously guiding a prepared strip of moldable gasket material into position between said punch and die members for movement therewith during rotation of said drum, and means for causing relative rectilinear movement between successive cooperating members to cause the punch members to blank successive gaskets from said strip of moldable material and deposit said blanked gaskets in successive closure elements.

6. A machine comprising in combination, a rotary support, a series of cooperating punch and die members mounted on said support for movement therewith and for rectilinear motion relative to each other, means for supporting a closure element adjacent each pair of cooperating punch and die members, means for continuously guiding a prepared strip of gasket-forming material into position between said cooperating members for movement therewith during a predetermined part of the rotation of said support, means for actuating said punch members at a predetermined point in the rotation of said support to blank successive gaskets from said strip of gasket-forming material and position said blanked gaskets in the successive closure elements, and means for retracting said punch members at a predetermined point in the rotation of said support to free said strip and the associated closure element.

7. A machine comprising in combination, a rotary drum, cooperating blanking punch and die members relatively movable parallel to the axis of said drum, means for guiding a continuous strip of moldable gasket-forming material between said cooperating punch and die members, means to operate said punch and die members for cutting gasket blanks from said strip of moldable gasket-forming material placed therebetween, said drum being formed with a closure holding pocket adjacent said die member, means for positioning a closure element in said pocket upon rotation of said drum, means actuated by rotation of said drum for causing said punch member to punch a gasket from said material and deposit it in successive closure elements with a molding pressure sufficient to shape the material to form gaskets of predetermined configuration in said elements.

8. A machine comprising in combination, a rotary support, a series of cooperating rectilinearly relatively movable gasket forming dies mounted on said support for movement therewith, means for supporting a closure element adjacent each pair of cooperating dies, means for guiding a strip of prepared gasket-forming material between said cooperating dies during movement thereof with said support, means actuated by rotation of said support for relatively moving said cooperating dies to cut successive gaskets from said strip and deposit them in successive closure elements, and means actuated by rotation of said support for opening said cooperating dies to free said strip therefrom.

9. A machine comprising in combination, a rotary drum having a peripheral slot for receiving a continuous strip of moldable gasket-forming material for movement with said drum, a plurality of annular cutting die members mounted on said drum along one side of said slot, a plurality of punching die members mounted along the other side of said slot and movable across said slot through said annular cutting die members, a closure holding pocket adjacent each cutting die, means for guiding a prepared strip of moldable gasket-forming material into said slot between said cutting dies and punches, and means actuated by rotation of said drum for reciprocating said punching dies seriatim to successively cut gasket blanks from said strip and deposit said blanks in successive closure members located in said pockets under sufficient pressure to shape the blanks to form gaskets of predetermined form in and adhere them to said closure members.

10. A machine comprising in combination, a rotary drum having a peripheral slot for receiving a continuous strip of a moldable gasket-forming material for movement with said drum, a plurality of annular cutting die members mounted on said drum along one side of said slot, a plurality of punching die members mounted along the opposite side of said slot and movable across said slot toward and from said annular cutting die members, a closure holding pocket adjacent each cutting die opening through the peripheral face of said drum, means for feeding closure members to said pockets, means for guiding a prepared strip of moldable gasket-forming material into said slot between said cutting and punching die members, means actuated by rotation of said drum for reciprocating said punching dies seriatim to successively cut gasket blanks from said strip and deposit said blanks in successive closure members located in said pockets under sufficient pressure to shape the material of said blanks to form gaskets in said members, means for retracting said punches to release said strip and free said closure members for ejection from said pockets, and means for removing the skeletonized strip from said slot.

11. A machine comprising in combination, a rotary drum having a peripheral slot for receiving a continuous strip of a moldable gasket-forming curable material for movement with said drum, a plurality of annular cutting die members mounted on said drum along one side of said slot, a plurality of punching die members mounted along the opposite side of said slot and movable across said slot toward and from said annular cutting die members, a closure holding pocket adjacent each cutting die opening through the peripheral face of said drum, means for feeding closure members to said pockets, means for guiding a prepared strip of moldable gasket-forming material into said slot between said cutting and punching die members, means actuated by rotation of said drum for reciprocating said punching dies seriatim to successively cut gasket blanks from said strip and deposit said blanks in successive closure members located in said pockets under sufficient pressure to shape the material of said blanks to form gaskets in said members, means for retracting said punches to release said strip and free said closure members for ejection from said pockets, means for passing the gasket carrying closing members through a curing zone to cure the molded liners in place in said members, and means for removing the skeletonized strip from said slot.

12. A machine comprising in combination, a plasticizing mill, means for withdrawing from said mill a continuous strip of moldable liner-forming material, a rotary drum having a peripheral slot therein, means for continuously guiding said strip into said slot for movement with said drum, a series of cooperating relatively movable punch and cutting die members located on opposite sides of said slot and relatively movable to cut gasket blanks from said strip, means for holding closure members in position to receive successive gasket blanks, means for guiding a preformed strip of moldable gasket material into said slot between said cooperating punching and cutting dies, means responsive to rotation of said drum for actuating said punch members to blank gaskets from said strip and deposit said blanks in successive closure members under sufficient pressure to shape said blanks to form liners in said members and adhere them thereto, means for withdrawing said punch members to release said strip and free said lined closure members for ejection, and means for returning the skeletonized strip to said mill for reincorporation in the material being prepared for delivery to said drum.

13. A machine comprising in combination, a continuous series of cooperating dies travelling with substantially constant speed in a closed circular path and relatively movable along rectilinear lines, means for operating said dies for successively cutting from a strip of moldable gasket-forming material gasket blanks of predetermined form, means for holding a closure member to receive a blank, said blank being carried by one of said cooperating dies when cut from the strip, and means for moving said blank cutting and carrying die toward said closure holding means to deposit said blank in said closure member and mold the gasket to form.

14. A machine comprising in combination a rotary drum, provided with a series of pockets for holding a succession of closure members for movement with said drum, means for guiding a continuous strip of moldable gasket-forming material into position adjacent said closure members for movement therewith, a series of cooperating strip punching die members movable with said drum, and means for causing relative rectilinear movement between said die members for successively cutting gasket blanks from said strip and depositing said blanks in said closure members.

15. A machine comprising in combination a series of cooperating punch and die members relatively movable to blank gaskets for closure members from moldable material placed between them, means for supporting a closure member adjacent each die member, means for guiding between said cooperating punch and die members a strip of moldable gasket forming material having reinforcing ridges extending along the opposite sides thereof, and means for actuating said punch members to blank gaskets solely from the material of said strip located between said ridges and deposit the blank in the adjacent closure member.

16. A machine comprising in combination a plasticizing mill, a series of cooperating punch and die members relatively movable to blank gaskets for closure members from moldable material placed between them, means for supporting a closure member adjacent each die member, means for forming and withdrawing from said mill a strip of thin moldable gasket-forming material having reinforcing ridges extending along the opposite sides thereof, means for guiding said strip between said cooperating punch and die members, and means for actuating said punch members to blank gaskets solely from the material of said strip located between said ridges and deposit the blank in the adjacent closure member.

17. The method of providing closure members with molded gaskets, comprising continuously moving successive closure members through a gasket applying zone, guiding a prepared strip of moldable gasket-forming material and causing said strip to move at the same speed as said closure members in the same direction and along a path through said zone adjacent thereto, continuously moving a succession of punch and die members along the path of and in synchronism with the movement of the closures, operating said punch and die members seriatim to cut successive gasket blanks from said strip during movement thereof and deposit successive blanks in said closure members under pressure sufficient to mold said blanks to form gaskets in said members during movement thereof through said zone.

18. The method of providing closure members with molded gaskets, comprising continuously moving successive closure members through a gasket applying zone, guiding a prepared strip of moldable gasket-forming material and causing said strip to move at the same speed as said closure members in the same direction and along a path through said zone adjacent thereto, continuously moving a succession of punch and die members along the path of and in synchronism with the movement of the closures, operating said punch and die members seriatim to cut successive gasket blanks from said strip during movement thereof and deposit successive blanks in successive closure members under pressure sufficient to adhere said blanks to said members during movement thereof through said zone.

19. The method of providing closure members with sealing gaskets which comprises moving a series of naked closure members along a predetermined path, forming a strip of gasket-forming material having reinforcing ridges along the side edges thereof and moving the same along an adjacent path, and cutting gaskets solely from the material of said strip located between said reinforcing ridges and depositing the cut gaskets in said closure members during simultaneous movement of said strip and closure members.

20. The method of providing closure members with sealing gaskets which comprises moving a series of naked closure members and a strip of liner-forming material along adjacent paths at the same speed and maintained in spaced overlapping relation, blanking gaskets from said strip and transferring them to and depositing them in said closure members during movement of said strip and closure members, and molding said gaskets in place in said closure members to form finished gaskets.

21. The method of providing closure members with sealing gaskets which comprises moving a series of naked closure members and a strip of curable rubber gasket-forming material along adjacent paths at the same speed and maintained in spaced overlapping relation, blanking gaskets from said strip and transferring them to and depositing them in said closure members during movement of said strip and closure members, and molding said gaskets in place in said closure members to form finished gaskets and then curing the molded gaskets in place in said closure members.

22. A machine for lining beverage crowns comprising a drum having cavities for receiving crowns and carrying them in a circular path; a plurality of cutting dies traveling with the drum, one aligned with each cavity; a plurality of punches traveling with the drum, one aligned with each cutting die; means for guiding a strip of plastic molding compound into the circular path of the punches and dies; and means actuated by the rotation of the drum for causing said punches and dies successively to cut a disk from said strip and deposit the cut-out disk on a crown supported in its associated cavity and for holding the punch with sufficient pressure against the disk deposited in the crown to mold the disk to the contour of the end of the punch.

23. A machine for lining beverage crowns comprising a drum having cavities for receiving crowns and carrying them in a circular path; a plurality of cutting dies traveling with the drum, one aligned with each cavity; a plurality of punches traveling with the drum, one aligned with each cutting die; means for guiding a strip of plastic molding compound into the circular path of the punches and dies; means actuated by the rotation of the drum for causing said punches and dies successively to cut a disk from said strip and deposit the cut-out disk on a crown supported in its associated cavity and for forcing the punch with sufficient pressure against the disk deposited in the crown to mold the disk to the contour of the end of the punch, and means to maintain the punch in molding contact with said disk for a predetermined portion of the travel of the drum.

24. A machine for lining beverage crowns comprising a drum having cavities for receiving crowns and carrying them in a circular path; a plurality of cutting dies traveling with the drum, one aligned with each cavity; a plurality of punches traveling with the drum and aligned with each cutting die; means for guiding a strip of plastic molding compound into the circular path of the punches and dies; means actuated by the rotation of the drum for causing said punches and dies successively to cut a disk from said strip and deposit the cut-out disk on a crown supported in its associated cavity and for forcing the punch with sufficient pressure against the disk deposited in the crown to mold the disk to the contour of the end of the punch; means to maintain the punch in molding contact with said disk for a predetermined portion of the travel of the drum, the pressure of the punch against the crown maintaining the latter in said cavity; and means for successively retracting the punches from engagement with the lined crowns to allow removal of the latter from the cavities.

25. A machine for lining beverage crowns comprising a drum having cavities for receiving crowns and carrying them in a circular path; a plurality of cutting dies traveling with the drum, one aligned with each cavity; a plurality of punches traveling with the drum, one aligned with each cutting die; means for guiding a strip of plastic molding compound into the circular path of the punches and dies; means actuated by the rotation of the drum for causing said punches and dies successively (1) to cut from said strip a disk having a diameter smaller than the width of the strip whereby the strip becomes impaled on the punch, (2) to deposit the disk on a crown supported in its associated cavity and (3) to hold the punch with sufficient pressure against the disk deposited in the crown to mold the disk to the contour of the end of the punch; and means for withdrawing the punches from the disk and the cutout strip of molding compound.

26. A machine for lining beverage crowns comprising a drum having cavities for receiving crowns and carrying them in a circular path; a plurality of cutting dies traveling with the drum, one aligned with each cavity; a plurality of punches traveling with the drum, one aligned with each cutting die; means for guiding a strip of plastic molding compound into the circular path of the punches and dies; means actuated by the rotation of the drum for causing said punches and dies successively (1) to cut from said strip a disk having a diameter smaller than the width of the strip whereby the strip becomes impaled on the punch, (2) to deposit the cut-out disk on the crown supported in its associated cavity and (3) to hold the punch with sufficient pressure against the disk deposited in the crown to mold the disk to the contour of the end of the punch; means to maintain the punch in molding contact with the disk for a predetermined portion of the travel of the drum, the pressure of the punch against the crown maintaining the latter in said cavity; and means for retracting the punches from engagement with the lined crown to free the lined crown for removal from the cavity.

27. A machine for lining beverage crowns comprising a drum having cavities for receiving crowns and carrying them in a circular path; a plurality of cutting dies traveling with the drum, one aligned with each cavity; a plurality of punches traveling with the drum, one aligned with each cutting die; means for guiding a strip of plastic molding compound into the circular path of the punches and dies; means actuated by the rotation of the drum for causing said punches and dies successively (1) to cut from said strip a disk having a diameter smaller than the width of the strip whereby the strip becomes impaled on the punch, (2) to deposit the cut-out disk on the crown supported in its associated cavity and (3) to hold the punch with sufficient pressure against the disk deposited in the crown to mold the disk to the contour of the end of the punch; means to maintain the punch in molding contact with the disk for a predetermined portion of the travel of the drum, the pressure of the punch against the crown maintaining the latter in said cavity; and means for retracting the punches from engagement with the lined crown to free the lined crown for removal from the cavity and to withdraw the punches from the cut-out strip.

28. A machine for lining beverage crowns comprising a drum having cavities for receiving crowns and carrying them in a circular path; a cutting die traveling with the drum and aligned with each cavity and a punch traveling with the drum and aligned with each cutting die; means for producing from stock a strip of plastic molding compound; means for guiding said strip into the circular path of the punches and dies; means actuated by the rotation of the drum for causing said punches and dies successively, (1) to cut from said strip a disk having a diameter smaller than the width of the strip whereby the strip becomes impaled on the punch, (2) to deposit the cut-out disk on the crown supported in its associated cavity and (3) to hold the punch with sufficient pressure against the disk deposited in the crown to mold the disk to the contour of the end of the punch; means to maintain the punch in molding contact with the disk for a predetermined portion of the travel of the drum, the pressure of the punch against the crown maintaining the latter in said cavity; means for retracting the punches from engagement with the lined crown to free the lined crown for removal from the cavity and to withdraw the punches from the cut-out strip; and means for guiding the cut-out strip back to the strip producing means.

29. A machine comprising a series of several pairs of cooperating punch and die members mounted for movement in a circular path, means to mount said punch and die members for relative rectilinear motion, means to support a closure member adjacent each pair of cooperating punch and die members for movement therewith, means to guide a prepared strip of gasket forming material between said punch and die members for movement therewith and with said closure members in said circular path, and means to successively operate said punch and die members to blank a gasket from said strip and deposit the same in said closure member.

HENRY Z. GORA.

REFERENCES CITED

The following references are of record in the file of this patent:

UNITED STATES PATENTS

| Number | Name | Date |
|---|---|---|
| 1,619,210 | MacLaren | Mar. 1, 1927 |
| 1,750,708 | Edwards | Mar. 18, 1930 |
| 1,809,341 | Jensen | June 9, 1931 |
| 2,027,915 | Kux | Jan. 14, 1936 |
| 2,230,189 | Ferngren | Jan. 28, 1941 |
| 2,260,456 | Johnson | Oct. 28, 1941 |